(12) United States Patent
Lee

(10) Patent No.: US 6,257,087 B1
(45) Date of Patent: Jul. 10, 2001

(54) APPARATUS FOR CONTROLLING REAR ANGLE OF OUTSIDE MIRROR FOR AUTOMOBILE

(75) Inventor: Yong-ho Lee, Seoul (KR)

(73) Assignee: Poong Jeong Industrial Co., Ltd., Kyonggi-do (KR)

( * ) Notice: Subject to any disclaimer, the term of this patent is extended or adjusted under 35 U.S.C. 154(b) by 0 days.

(21) Appl. No.: 09/462,834
(22) PCT Filed: Jul. 8, 1998
(86) PCT No.: PCT/KR98/00198
§ 371 Date: Jan. 13, 2000
§ 102(e) Date: Jan. 13, 2000
(87) PCT Pub. No.: WO99/03707
PCT Pub. Date: Jan. 28, 1999

(30) Foreign Application Priority Data

Jul. 15, 1997 (KR) ................................. 97-18634

(51) Int. Cl.[7] ............................. F16C 1/14; B60R 1/068
(52) U.S. Cl. ........................................ 74/502.1; 74/501.6
(58) Field of Search ........................ 74/502.1, 501.5 R, 74/501.6; 359/872, 882, 875

(56) References Cited

U.S. PATENT DOCUMENTS

| | | | |
|---|---|---|---|
| 3,444,754 | * 5/1969 | Liedel | 74/502.1 |
| 3,468,186 | * 9/1969 | McIntyre et al. | 74/502.1 |
| 3,473,823 | * 10/1969 | Liedel | 74/502.1 X |
| 3,625,597 | * 12/1971 | Jones | 74/502.1 X |
| 3,655,273 | * 4/1972 | Pringle | 74/502.1 X |

* cited by examiner

Primary Examiner—Mary Ann Green
(74) Attorney, Agent, or Firm—Poskauer Rose LLP

(57) ABSTRACT

In an apparatus for controlling a rear angle of an outside mirror for an automobile, ultrasonic waves are, for a given period of time, projected onto: a controller (200) having coupling grooves (212, 212a, 212b) opposite to fixing grooves (211, 211a, 211b) for fixing the other end of inside cable (310) whose one end is fixed at a glass holder plate, and a supporting rod (220) with a predetermined length; and a control knob (100) having a coupling portion (110) with coupling projections (112, 112a, 112b) on its inside circumference, which correspond to the coupling grooves (212, 212a, 212b), for fixing the controller inserted, a supporting hole (113) with a predetermined length, where the supporting rod (220) is inserted into the inside of the coupling portion (110), and a hemispheric flange (120) having a guide hole (121) with a predetermined width, where a control case is inserted into the outside of the coupling portion (110), so that the coupling grooves (212, 212a, 212b) of the controller (200) are welded and mate with the coupling projections of the control knob (100), and that the supporting rod (220) of the controller and the supporting hole of the control knob (100) are welded and mate with each other. Accordingly, the apparatus causes parts to decrease in number, thereby simplifying assembly process and reducing the cost of manufacture, and enhancing the operation efficiency of the control knob (100).

3 Claims, 4 Drawing Sheets

APPARATUS FOR CONTROLLING REAR ANGLE OF OUTSIDE MIRROR FOR AUTOMOBILE

BACKGROUND OF THE INVENTION

1. Field of the Invention

The present invention relates to an apparatus for controlling a rear angle of an outside mirror for an automobile. More particularly, it relates to an apparatus for controlling a rear angle of an outside mirror for an automobile, in which a controller for supporting a cable coupled with a glass holder plate by a three point linkage method, is inserted into a control knob integrally formed with a knob cover, before being welded with ultrasonic waves for a given period of time, in order to secure a driver's rear view at the time of driving or reversing a car, thereby enhancing the operation efficiency of the control knob, and decreasing the cost of manufacture as well as simplifying assembly process due to parts number reduction.

2. Description of the Prior Art

Generally, when drivers take turns at driving, each driver controls a rear angle of an outside mirror 13 provided at the side of a car as shown in FIG. 1, in accordance with his body shape, in order to secure his rear view, for safety in driving.

As shown in FIG. 2, therefore, a conventional apparatus for controlling the rear angle of the outside mirror includes: a cable 30 having an inside cable 31 whose one end is fixed at a glass holder plate (not shown), and an outside cable 32 which lets the inside cable 31 slide inside; a controller 20 having a fixing groove 21 for fixing the other end of the inside cable 31, a controller cap 70 located at its upper portion, for fixing the inside cable 31 inserted into the fixing groove 21, and a guide groove 22 located at its lower portion; a control case 40 having a guide projection 41 opposite to the guide groove 22, a spring 60 mounted inside, which enables the cable 30 to maintain a specified tension, and a control holder 50 inserted into its outside, where the outside cable 32 is fixed; a control knob 10 which is connected with an arm 11 formed in a mold, where the controller 20 slides along the guide projection 41 of the control case 40, so that the cable 30 becomes tight and loose, thereby controlling a rear angle of an outside mirror; and a knob cover 80 installed at the end of the control knob 10, for preventing an inflow of contaminants.

The following description relates to the operation of the conventional apparatus for controlling the rear angle of the outside mirror for the automobile constructed above.

When the driver moves the control knob 10 to his desired position, for the purpose controlling the rear angle of the outside mirror 13 (as shown in FIG. 1) according to his body shape, at the time of driving or reversing a car, the arm 11 makes the controller 20 move, and simultaneously the inside cable 31 is stretched and loosened by the controller 20, thereby controlling rear angle of the outside mirror.

Here, as the guide groove 22 slides along the guide projection 41 of the control case 40, the inside cable 31 is made to move, not separating from the controller 20, for its end is inserted into the fixing groove 21 and supported by the controller cap 70. Consequently, the rear angle of the outside mirror is controlled to a position where the driver desires.

The inside cable 31 is always able to maintain a specified tension by elasticity of the spring 60 mounted in the control holder 50. In case of operating the control knob 10, therefore, the cable 30 is made to move as much as the controller 20 slides, so that the rear angle of the outside mirror is controlled.

In this conventional apparatus, however, there are the problems that many of the parts are required for the interaction to control the rear angle of the outside mirror, and their structure is so complicated that parts assembly process becomes complicated, too, and the control function is deteriorated due to defect of the respective parts.

SUMMARY OF THE INVENTION

Accordingly, the present invention is directed to an apparatus for controlling a rear angle of an outside mirror for an automobile that substantially obviates one or more of the problems due to limitations and disadvantages of the related art.

An object of the present invention is to provide an apparatus for controlling a rear angle of an outside mirror for an automobile, in which a control cap for fixing a cable and a knob cover for protecting inside parts are not provided, causing parts to decrease in number, thereby simplifying assembly process and reducing the cost of manufacture.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, ultrasonic waves are, for a given period of time, applied onto: a controller having coupling grooves opposite to fixing grooves for fixing the other end of inside cable whose one end is fixed at a glass holder plate, and a supporting rod with a predetermined length; and a control knob having a coupling portion with coupling projections on its inside circumference, which correspond to the coupling grooves, for fixing the controller inserted, a supporting hole with a predetermined length, where the supporting rod is inserted into the inside of the coupling portion, and a hemispheric flange having a guide hole with a predetermined width, where a control case is inserted into the outside of the coupling portion, so that the coupling grooves of the controller are welded and mate with the coupling projections of the control knob, and that the supporting rod of the controller and the supporting hole of the control knob are welded and mate with each other.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention:

DESCRIPTION OF THE PREFERRED EMBODIMENT

Figure 1:
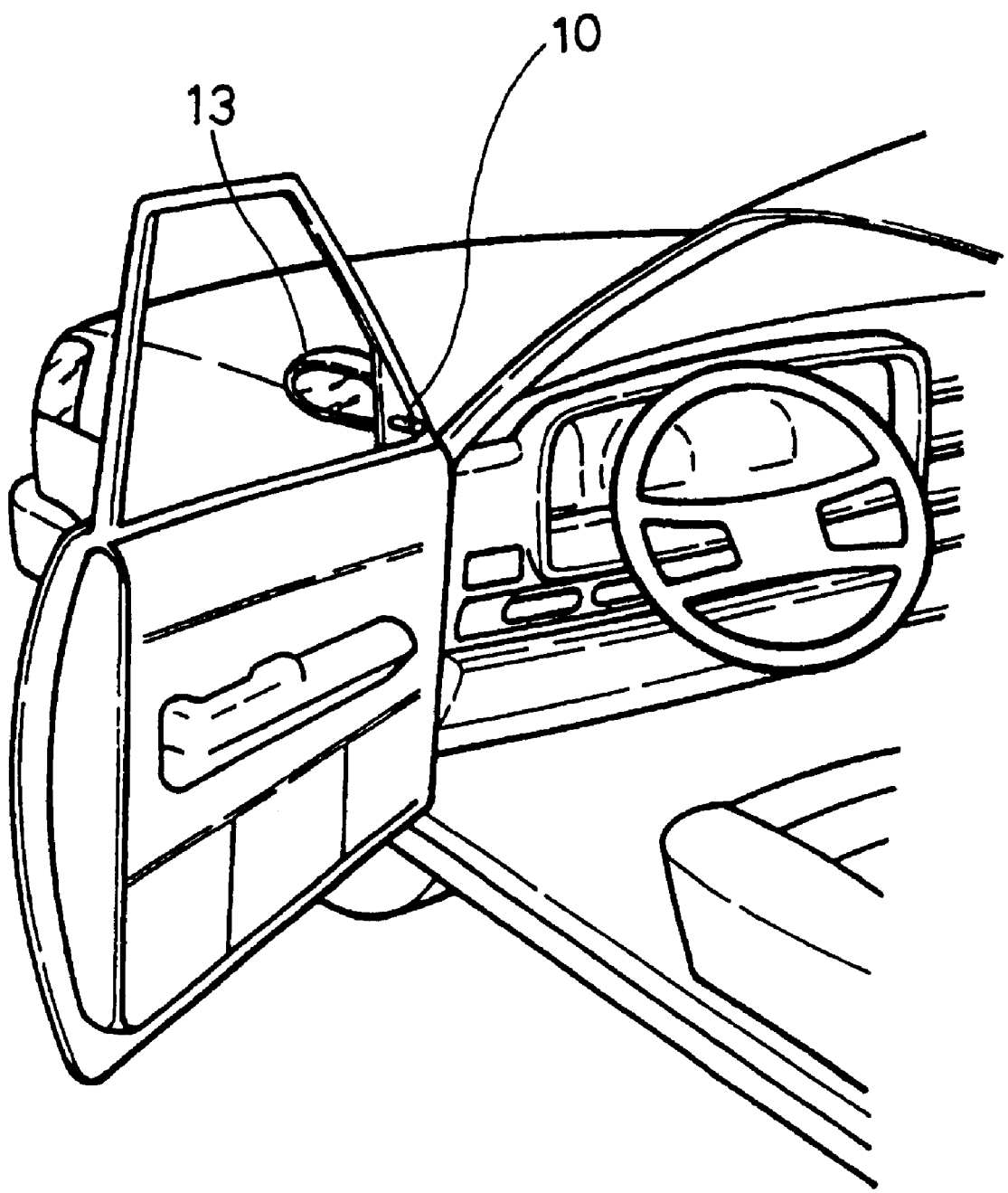
FIG. 1 is a pictorial view illustrating a conventional apparatus for controlling a rear angle of an outside mirror.
Figure 2:
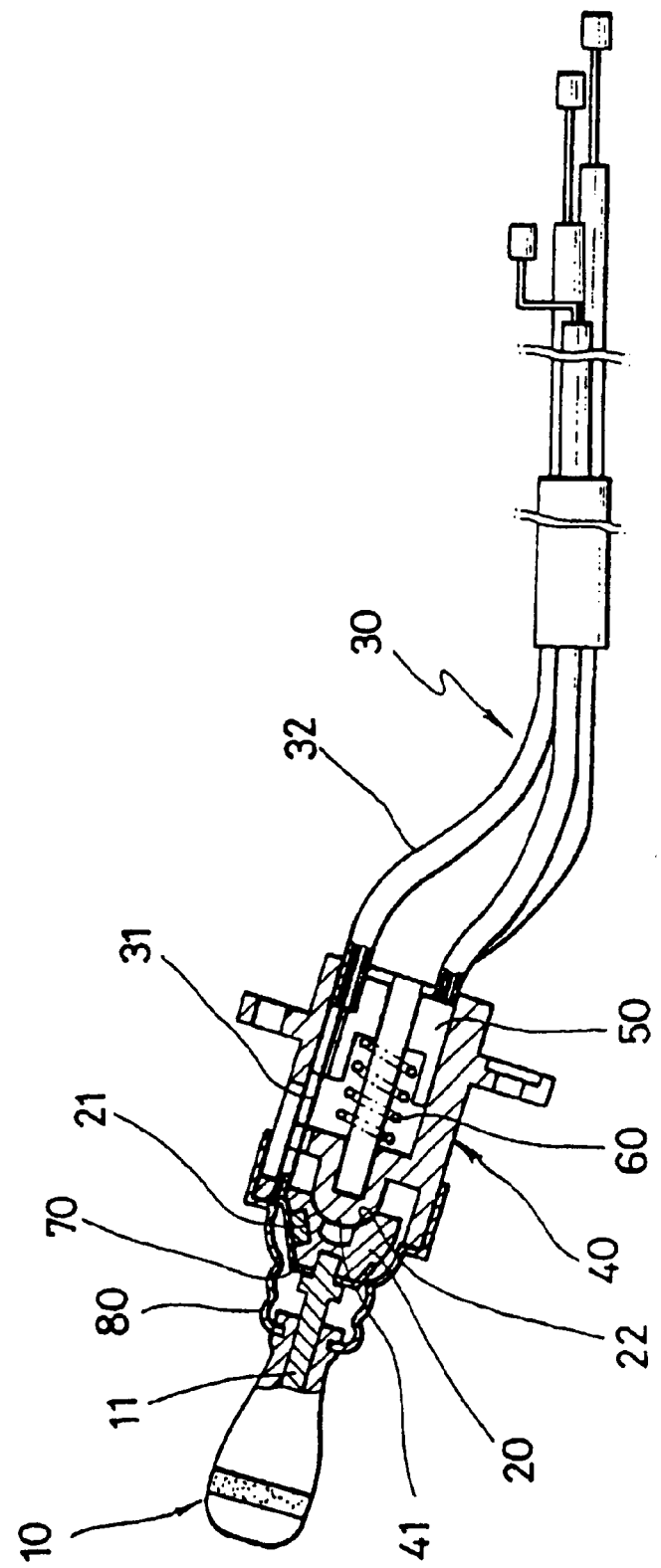
FIG. 2 is a cross-sectional view of a conventional apparatus for controlling a rear an outside mirror.
Figure 3:
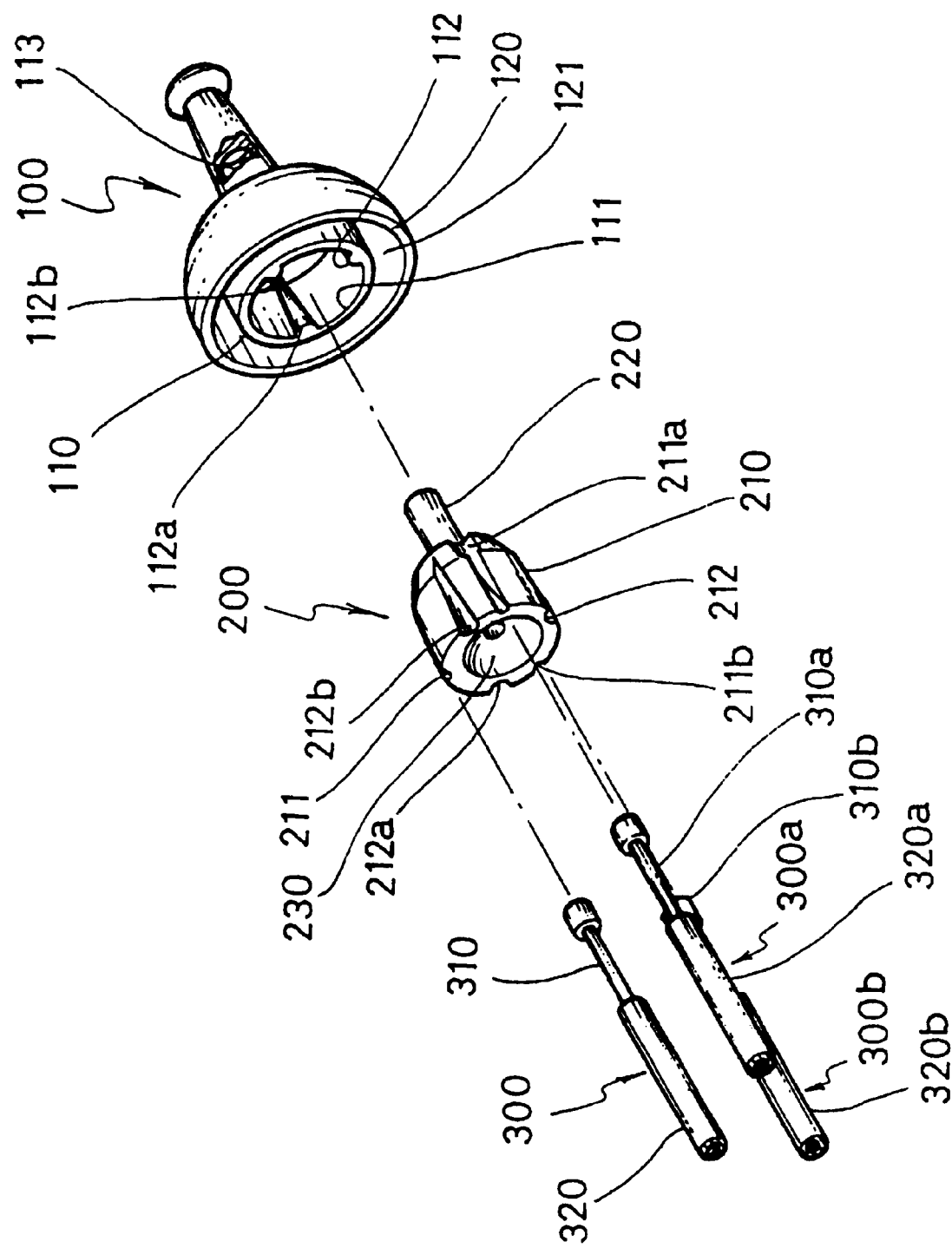
FIG. 3 is an exploded perspective view of the present invention.
Figure 4:
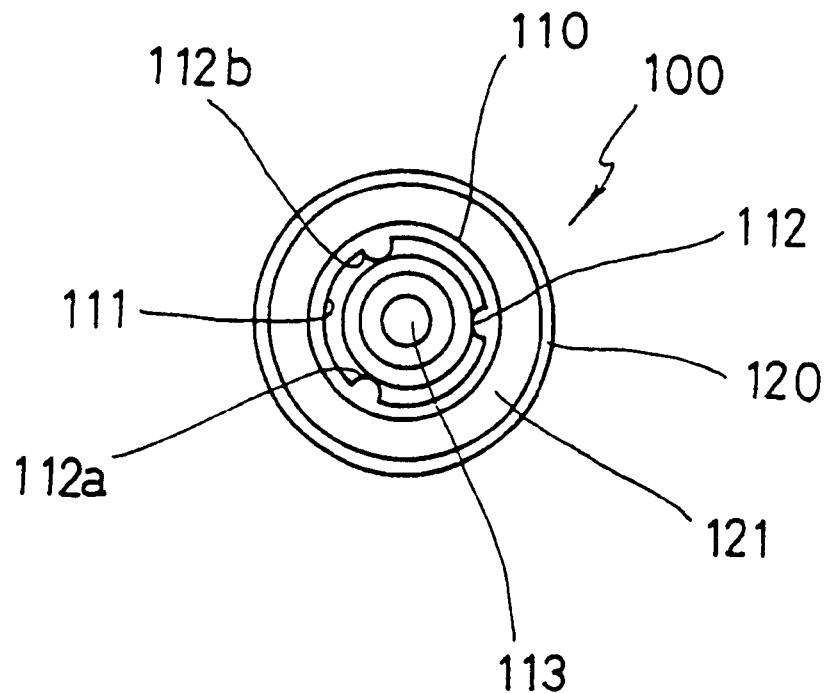
FIG. 4 is a rear elevation of an apparatus for controlling a rear angle of an outside mirror for an automobile, according to the present invention.
Figure 5:
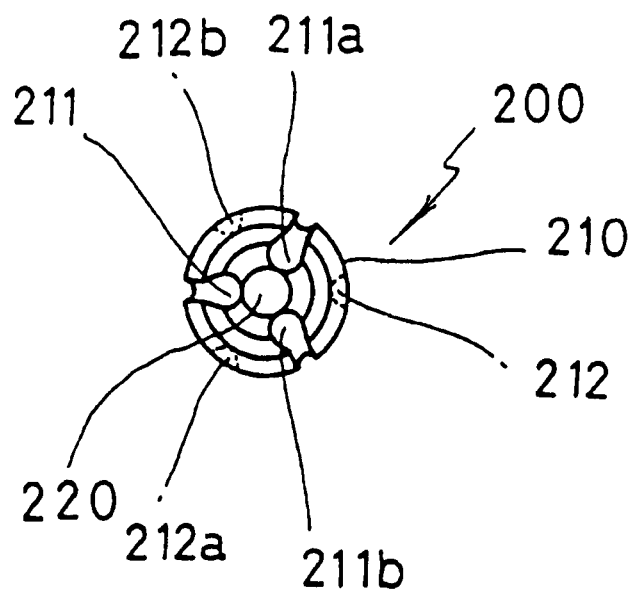
FIG. 5 is a plan view of a controller for fixing cables of an outside mirror, according to the present invention.

Reference will now be made in detail to the preferred embodiments of the present invention, examples of which are illustrated in the accompanying drawings.

As shown in the drawings, the apparatus comprises: cables 300, 300a, and 300b having inside cables 310, 310a, and 310b whose one ends are fixed at a glass holder plate (not shown) of an outside mirror (also not shown), and outside cables 320, 320a, and 320b which let the inside cables 310, 310a, and 310b slide inside; a controller 200 having fixing grooves 211, 211a, and 211b on its outside circumference 210, for fixing the other ends of the inside cables 310, 310a, and 310b, and a hemispheric guide groove 230 located at its lower portion; a control case (not shown) having a hemispheric guide projection opposite to the guide groove 230 of the controller 200, a spring (not shown) mounted inside, which enables the inside cables 310, 310a, and 310b of the cables 300, 300a, and 300b to maintain a specified tension, and a control holder (not shown) inserted into its outside, where the outside cables 320, 320a, and 320b are fixed; and a control knob 100, in which the controller 200 slides along the guide projection of the control case, so that the cables 300, 300a, and 300b become tight and loose, thereby controlling a rear angle of the outside mirror, wherein the controller 200 also has coupling grooves 212, 212a, and 212b opposite to the fixing grooves 211, 211a, and 211b for fixing the other ends of the inside cables 310, 310a, and 310b, and a supporting rod 220 with a predetermined length, and the control knob 100 also has a coupling portion 110 with coupling projections 112, 112a, and 112b on its inside circumference 111, which correspond to the coupling grooves 212, 212a, and 212b, for fixing the controller 200 inserted, and a supporting hole 113 with a predetermined length, where the supporting rod 220 of the controller 200 is inserted into the inside of the coupling portion 110.

The control knob 100 integrally forms a hemispheric flange 120 having a guide hole 121 with a predetermined width, where the control case is inserted into the outside of the coupling portion 110.

When the controller 200 is inserted into the control knob 100, before applied with ultrasonic waves for a given period of time, the coupling grooves 212, 212a, and 212b of the controller 200 are welded and mate with the coupling projections 112, 112a, and 112b of the control knob 100, and the supporting rod 220 of the controller 200 and the supporting hole 113 of the control knob 100 are welded and mate with each other.

The following description relates to the operation of the apparatus according to the present invention.

When drivers take turns at driving, each driver moves the control knob 100 to a position which he wishes to do, for the purpose of controlling the rear angle of the outside mirror, in accordance with his body shape, with the result that the controller 200 coupled with the coupling portion 110 of the control knob 100 also moves.

Consequently, the inside cables 310, 310a, and 310b which are fixed in the fixing grooves 211, 211a, and 211b formed on the outside circumference 210 of the controller 200, and the glass holder plate, and maintain a specified tension by means of the spring mounted in the control holder, also move in the same range as the controller 200.

Simultaneously with this, glass of the outside mirror also moves in the same range as the inside cables 310, 310a, and 310b.

That is, the other ends of the inside cables 310, 310a, and 310b are fixed in the fixing grooves 211, 211a, and 211b formed on the outside circumference 210 of the controller 200, to insert the controller 200 into the control knob 100. When the driver tightens and loosens the control knob 100, the guide groove 230 slides along the guide projection of the control case so that the inside cables 310, 310a, and 310b are stretched and loosened, because the controller 200 is coupled with the control knob 100. As a result, the rear angle of the outside mirror can be controlled.

Inside circumference 111 of the coupling portion 110 of the control knob 100 is attached to the outside circumference 210 of the controller 200, to insert the controller 200 into the control knob 100, before welded with ultrasonic waves for a given period of time. Consequently, the coupling grooves 212, 212a, and 212b of the controller 200 are welded and mate with the coupling projections 112, 112a, and 112b of the control knob 100, and simultaneously, the supporting rod 220 of the controller 200 and the supporting hole 113 of the control knob 100 are welded and mate with each other. Accordingly, the controller 200 is prevented from moving inside the control knob 100, to thereby perform its amicable operation.

In addition, the controller 200 and the control knob 100 are integrally linked with each other by supersonic waves, and a knob cover is integrally formed with the control knob 100, so that the parts can decrease in number. And, in case the driver moves the control knob 100 to a position which he wishes to do, the controller 200 is directly coupled with the control knob 100 so that its control function is enhanced, and the driver easily controls the rear angle of the outside mirror to his desired position, with no repeated operation of tightening and loosening of the control knob 100.

As described above, the control knob and the controller for fixing the other ends of the cables fixed with the glass holder plate, are welded with ultrasonic waves for a given period of time in order to control the rear angle of the outside mirror according to the driver's body shape, at the time of driving or reversing a car, so that they are directly coupled with each other, and the knob cover is integrally formed with the control knob, thereby enhancing the operation efficiency of the control knob, and decreasing the cost of manufacture as well as simplifying assembly process due to parts number reduction.

It will be apparent to those skilled in the art that various modifications and variations can be made in an apparatus for controlling a rear angle of an outside mirror for an automobile of the present invention without departing from the spirit or scope of the invention. Thus, it is intended that the present invention cover the modifications and variations of this invention provided they come within the scope of the appended claims and their equivalents.

What is claimed is:

1. An apparatus for controlling a rear angle of an outside mirror of an automobile, comprising:
    cables comprising inside cables having a first end for fixing to the outside mirror to be controlled, and outside cables which allow the inside cables to slide therein;
    a controller having fixing grooves on an outside circumference thereof for fixing a second end of the inside cables, and a guide groove located on a lower portion thereof;
    a control case having a guide projection located opposite to the guide groove of the controller, a spring mounted inside the control case which maintains the cables at a predetermined tension, and a control holder for fixing the outside cables; and a control knob wherein the controller slides along the guide projection of the control case thereby tightening and loosening the cables, wherein the controller further has coupling grooves located opposite to the fixing grooves, and a supporting rod having a predetermined length, and wherein the control knob comprises a coupling portion having coupling projections on an inside circumference thereof, the coupling projections of the coupling portion of the control knob corresponding to the coupling grooves of the controller, and a supporting hole having a predetermined length, wherein the supporting rod of the controller is inserted into the coupling portion.

2. The apparatus of claim 1, wherein the control knob integrally forms a hemispheric flange having a guide hole with a predetermined width, and wherein the control case is inserted into the coupling portion.

3. The apparatus of claim 1, wherein the controller is inserted into the control knob and ultrasonic waves are applied for a given period of time, whereby the coupling grooves of the controller are welded and mate with the coupling projections of the control knob, and the supporting rod of the controller and the supporting hole of the control knob are welded and mate with each other.

* * * * *